(12) United States Patent
Yue et al.

(10) Patent No.: US 9,175,735 B2
(45) Date of Patent: Nov. 3, 2015

(54) ELECTRICALLY CONTROLLED SILICON OIL FAN CLUTCH ROTARY VALVE DEVICE

(71) Applicant: SUZHOU RISING AUTO PARTS CO., LTD., Taicang, Suzhou, Jiangsu Province (CN)

(72) Inventors: Shengqiao Yue, Taicang (CN); Dajin Gong, Taicang (CN)

(73) Assignee: SUZHOU RISING AUTO PARTS CO., LTD, Suzhou (CN)

( * ) Notice: Subject to any disclaimer, the term of this patent is extended or adjusted under 35 U.S.C. 154(b) by 95 days.

(21) Appl. No.: 14/057,370

(22) Filed: Oct. 18, 2013

(65) Prior Publication Data
US 2015/0034449 A1    Feb. 5, 2015

(30) Foreign Application Priority Data
Jul. 31, 2013    (CN) .......................... 2013 1 0326208

(51) Int. Cl.
*F16D 35/02* (2006.01)
*F16D 48/02* (2006.01)
*F01P 7/04* (2006.01)
*F01P 7/08* (2006.01)

(52) U.S. Cl.
CPC ................ *F16D 25/14* (2013.01); *F01P 7/042* (2013.01); *F01P 7/084* (2013.01); *F16D 35/024* (2013.01)

(58) Field of Classification Search
None
See application file for complete search history.

(56) References Cited

U.S. PATENT DOCUMENTS 5,152,383 A * 10/1992 Boyer et al. ............... 192/58.61
2001/0027903 A1 * 10/2001 Lutz ............................ 192/58.5

FOREIGN PATENT DOCUMENTS

EP    0 935 080 A1 *  8/1999

* cited by examiner

*Primary Examiner* — Rodney H Bonck
(74) *Attorney, Agent, or Firm* — Oliff PLC

(57) ABSTRACT

Disclosed is an electrically controlled silicon oil fan clutch rotary valve device. The valve device is based on a magnetic mandrel, including a Y-shaped element, a driven disc, a driving disc, and a guide disc intercombined, which achieves control over flow of silicon oil by controlling rotation of a valve, and achieves precise control over positions by resetting through a reset torsion spring and using outer teeth and inner teeth of the driving disc and the driven disc as well as a stop device. In the present invention, the valve may be controlled to be stable at an appropriate position through the size of the current of the coil, so as to achieve a stepless speed and achieve a purpose of precisely controlling the clutch.

4 Claims, 4 Drawing Sheets

ELECTRICALLY CONTROLLED SILICON OIL FAN CLUTCH ROTARY VALVE DEVICE

BACKGROUND OF THE INVENTION

1. Field of the Invention

The present invention relates to the field of automobile parts, and specifically to an electrically controlled silicon oil fan clutch rotary valve device.

2. Related Art

Automobile energy saving is a long-term policy of national economic development, energy consumption of the automobile fan accounts for 5%-10% of energy of the engine, and in fact, automobiles require fan cooling only in about 10% of the time. So, automobile fan energy saving is a key technology of the automobile energy saving.

An existing automobile silicon oil fan clutch uses a temperature sensor technology, and its working principle is transforming a thermal load condition of the engine into a rotation motion through a bimetallic temperature sensor, and opening a valve hole, so that silicon oil enters a working cavity to drive a fan to move at a high speed; when a load of the engine is low, the temperature sensor drives the valve to close the valve hole, and the silicon oil of a oil storage cavity no longer flows into the working cavity, to drive the fan to rotate at a low speed, thereby playing a role of controlling temperature of the engine.

A current electrically controlled clutch adopts valve opening and closing, which is relatively stable only at the high speed and the low speed, and is unstable at an intermediate process speed, moreover, a moving direction of a valve is perpendicular to a direction of flow velocity, the silicon oil may push the valve during the flow, resulting in that the valve jitters endlessly, and the jitter may cause the flow velocity of the silicon oil to be unstable, thereby affecting the rotation speed of the fan. Therefore, if the existing valve intends to achieve precise control, it still has a long way to go. An existing clutch mostly uses a spiral bimetallic temperature sensor or a sheet-like bimetallic temperature sensor, and its defects include: 1. temperature sensing sensitivity is not high, the reaction is slow, and the engine cooling problem may not be solved efficiently; 2. control precision is low, and it is not the ideal linear element; 3. it is easy to be affected by external temperatures and distance between the clutch and a radiator; 4. temperature adjustment and control only can be performed through the radiator, and control elements are single; 5. as the degree of deformation of the temperature sensor is limited, the control over the temperature is limited; 6. actions are taken only based on temperature change of the radiator, and the control is relatively passive; and 7. only open-loop control can be achieved.

SUMMARY OF THE INVENTION

Objective: an objective of the present invention is to provide an electrically controlled silicon oil fan clutch rotary valve device which is under high-precision control, responds quickly, is slightly affected by silicon oil, and may achieve stepless speed regulation of the fan.

Technical solution: to achieve the above objective, the present invention provides an electrically controlled silicon oil fan clutch rotary valve device disposed at one side of an oil storage cavity of a silicon oil fan clutch end-cover, including a magnetic mandrel, where the valve device includes a Y-shaped element with an opening cut in the center, a driven disc, a driving disc, a guide disc, a valve, and a torsion spring; the magnetic mandrel passes through the guide disc and the driving disc sequentially, and is connected to the Y-shaped element in a front end of the magnetic mandrel; the driven disc sleeves a periphery of the driving disc and is installed on the guide disc, a stop device driving the driven disc through rotation of the driving disc and limiting a relative rotation angle between the driving disc and the driven disc to a certain range is disposed between the driven disc and the driving disc, the Y-shaped element is installed on the driven disc or the guide disc; the valve is installed on the driven disc; and the reset torsion spring is installed on the guide disc.

The periphery of the driving disc is provided with several outer teeth, the driven disc is provided with several inner teeth corresponding to the outer teeth, the outer teeth and the inner teeth are adjacent to each other and have a gap, the stop device is a projection disposed on a lower surface of the Y-shaped element, and the projection simultaneously occupies slots of the outer teeth and the inner teeth. Herein, it should be further emphasized that, the stop device has two functions, the first one is that, when the mandrel magnetically drives the driving disc to rotate, the driving disc is stuck between the slots of the inner teeth and the outer teeth through the stop device, to drive the driven disc to rotate, thereby achieving rotation of the valve; the second one is that, when the guide disc is reset under an action of the torsion spring, the driven disc and the Y-shaped element are driven to rotate reversely, and the stop device is used to ensure the ultimate position of recovery. In order to simultaneously achieve the foregoing two functions, the stop device must simultaneously occupy a pair of slots of the inner teeth and the outer teeth. The stop device according to the present invention includes, but is not limited to, a block projection, a sheet-like projection or other irregular projection, and the stop projection may either exist independently, or combine with other components in the silicon oil fan clutch, or combine with the Y-shaped element of the rotary valve in the present invention; it should be understood that, the stop device based on the concept of the present invention should fall within the protection scope of the present invention.

As a preferred solution of the present invention, both the number of the outer teeth and the number of the inner teeth are 6. When the width of the slots is similar to the width of the outer teeth and the inner teeth, a relative rotation angle between the driving disc and the driven disc is between 30° and 60°, and under the fine control of the electromagnetic force, it just meets the condition that the valve rotates in the oil return port and covers the port, so as to control the flow of the silicon oil.

The magnetic mandrel according to the present invention is provided with an electromagnetic coil of an input duty cycle voltage signal externally. The electromagnetic coil is energized to generate a magnetic field, and magnetic energy is guided into the driving disc through a mandrel magnet, so as to make it rotate.

The guide disc includes an annular body, a convex ring disposed on a periphery of the body and internally connected to the driven disc, and a concave ring corresponding to the driving disc. The convex ring achieves a tight connection between the driven disc and the guide disc, and the design of the concave ring renders a gap formed between the driving disc and the guide disc for feeding of the silicon oil.

Beneficial effect: the electrically controlled silicon oil fan clutch rotary valve device in the present invention uses a rotary valve structure, capable of controlling the valve to be stable at an appropriate position through the size of current of a coil, so that intermediate speeds are stably and effectively controlled; the greater the current passed to the coil is, the larger the rotation angle of the driving disc is, so that the torsion spring automatically resets. The present invention could stably control the fan at any speed between low speeds and high speeds through an automobile ECU, so as to achieve a stepless speed and achieve a purpose of precisely controlling the clutch.

DETAILED DESCRIPTION OF THE EMBODIMENTS

The present invention is further described in the following in combination with specific embodiments.

Figure 1:
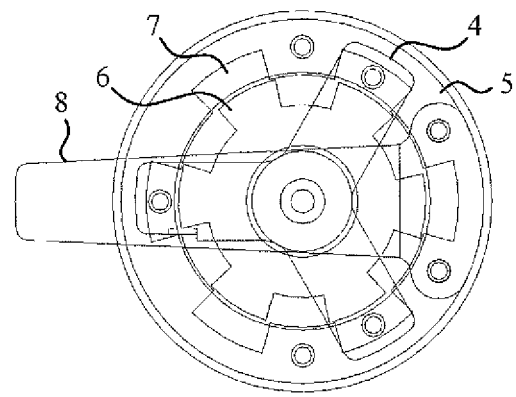
FIG. 1 is a schematic structural diagram of an electrically controlled silicon oil fan clutch rotary valve device according to the present invention.
Figure 2:
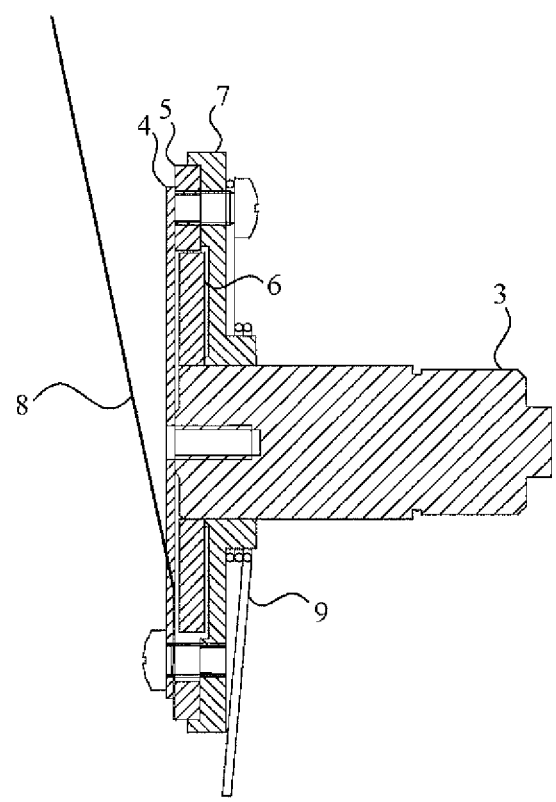
FIG. 2 is a side view of the FIG. 1.
Figure 3:
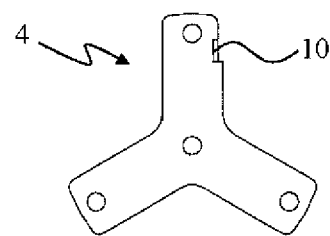
FIG. 3 is a schematic structural diagram of a Y-shaped element according to the present invention.
Figure 4:
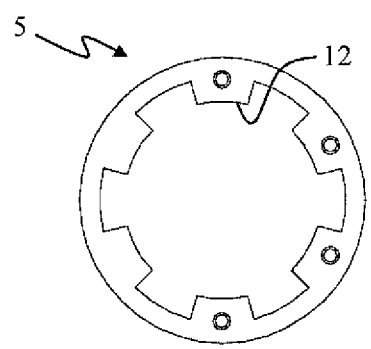
FIG. 4 is a schematic structural diagram of a driven disc according to the present invention.
Figure 5:
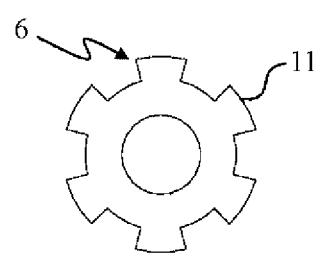
FIG. 5 is a schematic structural diagram of a driving disc according to the present invention.
Figure 6:
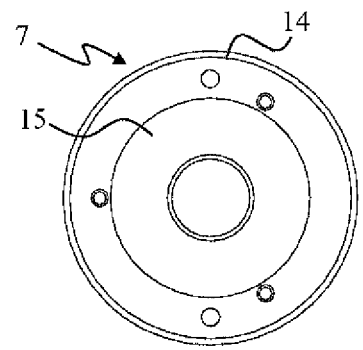
FIG. 6 is a schematic structural diagram of a guide disc according to the present invention.
Figure 7:
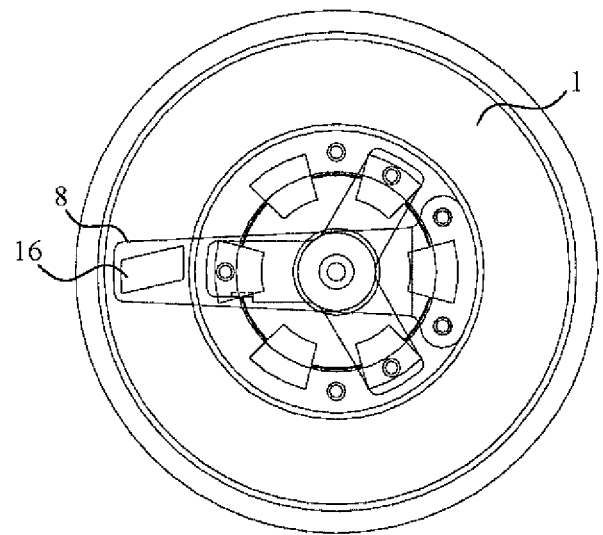
FIG. 7 is a schematic diagram of a state in which an electrically controlled silicon oil fan clutch rotary valve device closes an oil return hole according to the present invention.
Figure 8:
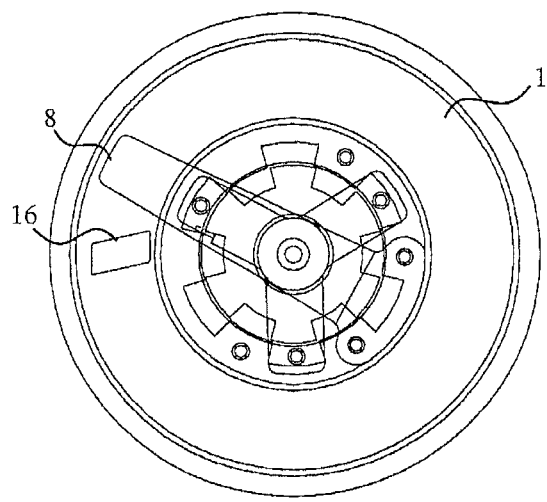
FIG. 8 is a schematic diagram of a state in which the electrically controlled silicon oil fan clutch rotary valve device opens the oil return hole according to the present invention.
Figure 9:
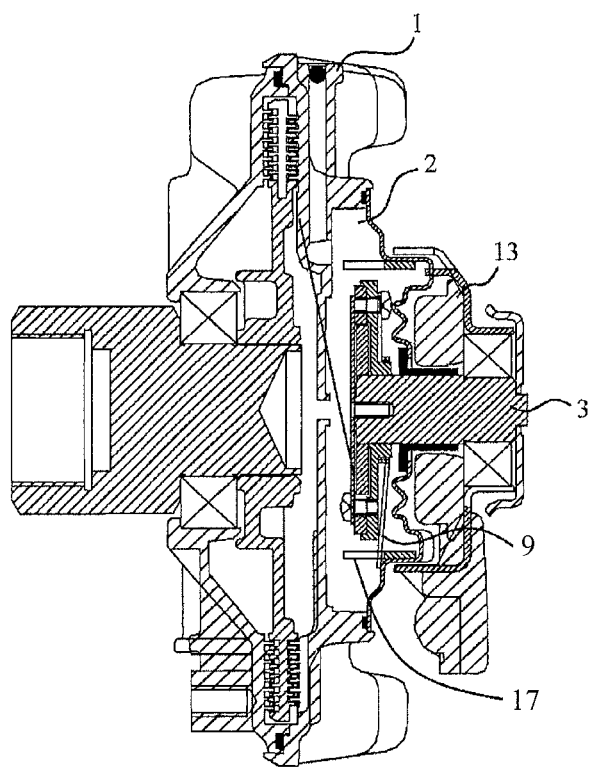
FIG. 9 is a schematic view of assembling of Embodiment 2 according to the present invention.

Referring to FIG. 1 to FIG. 9, an electrically controlled silicon oil fan clutch rotary valve device according to the present invention is disposed at one side of an oil storage cavity 2 of a silicon oil fan clutch end-cover 1, including a magnetic mandrel 3, where the magnetic mandrel 3 is provided with an electromagnetic coil 13 of an input duty cycle voltage signal externally. The electromagnetic coil 13 is energized to generate a magnetic field, and magnetic energy is guided into the driving disc 6 through a mandrel 3 magnet, so as to make it rotate. The valve device includes a Y-shaped element 4 with an opening cut in the center, a driven disc 5, a driving disc 6, a guide disc 7, a valve 8, and a torsion spring 9; the magnetic mandrel 3 passes through the guide disc 7 and the driving disc 6 sequentially, and is connected to the Y-shaped element 4 in a front end of the magnetic mandrel 3; the driven disc 5 sleeves a periphery of the driving disc 6 and is installed on the guide disc 7, a stop device 10 driving the driven disc 5 through rotation of the driving disc 6 and limiting a relative rotation angle between the driving disc 6 and the driven disc 5 to a certain range is disposed between the driven disc 5 and the driving disc 6, the Y-shaped element 4 is installed on the driven disc 5 or the guide disc 7, which is a Y-shaped plate with an opening cut in the center included by three metals; the valve 8 is installed on the driven disc 5, is oblique outwardly, and corresponds to an oil return hole 16 of the end-cover 1, which covers the oil return hole 16 when the driving disc 6 drives the driven disc 5 to drive the valve 8 to rotate, so as to achieve control over the flow of the silicon oil.

The reset torsion spring 9 is installed on the guide disc 7, a position sheet 17 is disposed in the electrically controlled silicon oil fan clutch, and an end portion of the torsion spring 9 is stopped at the position sheet 17, to ensure that it is in a recovery state. The guide disc 7 includes an annular body, a convex ring 14 disposed on a periphery of the body and internally connected to the driven disc 5, and a concave ring 15 corresponding to the driving disc 6. The convex ring 14 achieves a tight connection between the driven disc 5 and the guide disc 7, and the design of the concave ring 15 renders a gap formed between the driving disc 6 and the guide disc 7 for feeding of the silicon oil.

The periphery of the driving disc 6 is provided with several outer teeth 11, the driven disc 5 is provided with several inner teeth 12 corresponding to the outer teeth 11, the outer teeth 11 and the inner teeth 12 are adjacent to each other and have a gap; the outer teeth 11, the inner teeth 12, and slots of the driving disc 6 and the driven disc 5 have similar width, the stop device 10 is a projection disposed on a lower surface of the Y-shaped element 4, and the projection simultaneously occupies the slots of the outer teeth 11 and the inner teeth 12. The stop device 10 has two functions, the first one is that, when the mandrel 3 magnetically drives the driving disc 6 to rotate, the driving disc 6 is stuck between the slots of the inner teeth 12 and the outer teeth 11 through the stop device 10, to drive the driven disc 5 to rotate, thereby achieving rotation of the valve 8; the second one is that, when the guide disc 7 is reset under the action of the torsion spring 9, the driven disc 5 and the Y-shaped element 4 are driven to rotate reversely, and the stop device 10 is used to ensure an ultimate position of recovery.

As a the most preferred embodiment, both the number of the outer teeth 11 of the driving disc 6 and the number of the inner teeth 12 of the driven disc 5 are 6. When the width of the slots is similar to the width of the outer teeth 11 and the inner teeth 12, a relative rotation angle between the driving disc 6 and the driven disc 5 is between 30° and 60°, and under the fine control of the electromagnetic force, it just meets the condition that the valve 8 rotates in the oil return port and covers the port, so as to control the flow of the silicon oil.

The above descriptions are merely preferred embodiments of the present invention. It should be noted that persons of ordinary skill in the art may make several modifications and improvements without departing from the principle of the present invention, which should be construed as falling within the scope of the present invention.

What is claimed is:

1. An electrically controlled silicon oil fan clutch rotary valve device disposed at one side of an oil storage cavity of a silicon oil fan clutch end-cover, comprising a magnetic mandrel, wherein: the valve device comprises a Y-shaped element with an opening cut in the center, a driven disc, a driving disc, a guide disc, a valve, and a torsion spring: the magnetic mandrel passes through the guide disc and the driving disc sequentially, and is connected to the Y-shaped element in a front end of the magnetic mandrel; the driven disc sleeves a periphery of the driving disc and is installed on the guide disc, a stop device driving the driven disc through rotation of the driving disc and limiting a relative rotation angle between the driving disc and the driven disc to a certain range is disposed between the driven disc and the driving disc, the Y-shaped element is installed on the driven disc or the guide disc; the valve is installed on the driven disc; and the torsion spring is installed on the guide disc, wherein: the periphery of the driving disc is provided with several outer teeth, the driven disc is provided with several inner teeth corresponding to the outer teeth, the outer teeth and the inner teeth are adjacent to each other and have a gap, the stop device is a projection disposed on a lower surface of the Y-shaped element, and the projection simultaneously occupies slots of the outer teeth and the inner teeth.

2. The electrically controlled silicon oil fan clutch rotary valve device according to claim 1, wherein: both the number of the outer teeth and the number of the inner teeth are 6.

3. The electrically controlled silicon oil fan clutch rotary valve device according to claim 1, wherein: the magnetic mandrel is provided with an electromagnetic coil of supplied with an input duty cycle voltage signal externally.

4. The electrically controlled silicon oil fan clutch rotary valve device according to claim 1, wherein: the guide disc comprises an annular body, a convex ring disposed on a periphery of the body and internally connected to the driven disc, and a concave ring corresponding to the driving disc.

* * * * *